(12) United States Patent
Andes

(10) Patent No.: US 6,443,252 B1
(45) Date of Patent: Sep. 3, 2002

(54) PASSENGER STANDING PLATFORM ON A POWERED WHEELCHAIR

(76) Inventor: Royce C. Andes, 2704 State Highway 99, Biggs, CA (US) 95917

(*) Notice: Subject to any disclaimer, the term of this patent is extended or adjusted under 35 U.S.C. 154(b) by 0 days.

(21) Appl. No.: 09/637,337

(22) Filed: Aug. 10, 2000

Related U.S. Application Data

(60) Provisional application No. 60/148,890, filed on Aug. 13, 1999.

(51) Int. Cl.[7] .................................................. B60K 1/00
(52) U.S. Cl. ................... 180/65.1; 280/304.1; 280/32.7
(58) Field of Search ............................... 180/65.1, 907, 180/19.1, 209; 280/32.7, 291, 292, 296, 304.1, 304.5, 87.043, 250.1, 755

(56) References Cited

U.S. PATENT DOCUMENTS

| | | | | |
|---|---|---|---|---|
| 1,711,418 A | * | 4/1929 | Linden | |
| 3,485,314 A | * | 12/1969 | Herr | 180/19 |
| 3,807,520 A | | 4/1974 | Chisholm | |
| 4,096,920 A | * | 6/1978 | Heyn | 180/11 |
| 4,902,029 A | | 2/1990 | Gain et al. | |
| 5,340,140 A | * | 8/1994 | Bynum | 280/304.1 |
| 5,575,348 A | | 11/1996 | Goertzen et al. | |
| 5,778,996 A | * | 7/1998 | Prior et al. | 180/65.1 |
| 5,845,724 A | * | 12/1998 | Barrett | 180/65.1 |
| 5,947,505 A | * | 9/1999 | Martin | 280/493 |
| 6,131,679 A | * | 10/2000 | Pulver et al. | 180/65.1 |
| 6,273,444 B1 | * | 8/2001 | Power | 280/304.1 |

* cited by examiner

Primary Examiner—Anne Marie Boehler
Assistant Examiner—Tony Winner

(57) ABSTRACT

A wheelchair with a platform for transporting a standing rider in addition to a rider sitting in the wheelchair. The wheelchair is self-propelled by a motor coupled to drive one or more ground/surface contacting wheels. The platform on which the additional person stands is attached to the chair frame preferably with pivot-allowing structuring at one edge of the platform and at the back end of the wheelchair. The platform is selectably positionable in a first position and second position. The first position being one which the platform is horizontally disposed for being stood on by a rider, and the second position being one wherein the platform is on edge, or pivoted approximately 90 degrees upward to a stored position more closely adjacent the wheelchair. The platform includes two small diameter 360 degree swivel casters or wheels which contact the ground for supporting the distal end of the platform when stood on by a rider. The pivot attachment of the platform to the wheelchair also serves as a live axle or pivot during use, allowing the platform to pivot and change angle relative to the wheelchair when the casters encounter bumps or elevational changes. Controls for motion and steering are provided for the chair occupant, and preferably duplicate controls are positioned for the rider behind the chair occupant.

5 Claims, 4 Drawing Sheets

US 6,443,252 B1

PASSENGER STANDING PLATFORM ON A POWERED WHEELCHAIR

A claim to the benefits under 35 U.S.C. 120 for this application is hereby made to the earlier filing date of my pending U.S. Provisional application for patent, Ser. No. 60/148,890 filed Aug. 13, 1999.

BACKGROUND OF THE INVENTION

1. Field of the Invention

The present invention relates to wheelchairs such as for handicapped or chair-bound individuals, and more particularly to the type wherein the chair and human occupant of the chair can be propelled by a motor attached to the chair and coupled to drive one or more ground/surface contacting wheels so as to move the chair and occupant along the surface.

2. Brief Description of the Prior Art

For several decades now, and with good success, driveable self-propelled wheelchairs have been used in the U.S. To my knowledge, none of the prior art self-propelled wheelchairs which are structured with a seat only wide enough for a single sitting occupant include structural facilities, as herein taught, on which a second person such as a caregiver or friend can also be transported by the powered wheelchair. Many modern powered wheelchairs have substantial power and range on a single battery charge. They are also capable of traveling at a speed equal to or greater than a fast walk, although the travel speed as well as the steering can be controlled by the occupant. Wheelchair occupants often travel with either a caregiver or friend who must walk along side the wheelchair. The walker (caregiver or friend) can tire or become physically stressed due to the rate of travel or distance traveled, which is a problem.

The present invention solves the above described problem of the caregiver or friend having to walk by providing a platform on which the caregiver or friend stands and is also transported by the wheelchair.

The prior art "Wheelchair with Luggage Carrier" of U.S. Pat. No. 4,902,029 issued Feb. 20, 1990 to Gain et al is an example of a structure which might be capable of transporting a second person (passenger) on the rear mounted cargo carrier, however the structuring is not the same as that of the present invention and appears to include the major disadvantage of at least semi-permanently substantially extending the length of the wheelchair. The Gain et al wheelchair also appears to be a manually powered wheelchair which would require the person supplying the manual power to work harder to propel the chair since the weight of two people would be carried by the wheelchair.

SUMMARY OF THE INVENTION

My U.S. Provisional application for patent, Ser. No. 60/148,890 filed Aug. 13, 1999 is herein incorporated by reference.

The present invention relates to wheelchairs, and more particularly to the type wherein the chair and human occupant of the chair can be propelled by one or more motors or other propulsion system attached to the chair and coupled to drive one or more ground/surface contacting wheels so as to move the chair and occupant(s) along the surface. The present invention solves the above described prior art problem of the caregiver or friend having to walk by providing a platform on which the caregiver or friend stands and is also simultaneously transported along with the sitting person by the wheelchair. The platform, in a preferred embodiment, is mounted with hinge or pivot-allowing structuring behind the wheelchair, and preferably assumes a first position and second position each selectable by a caregiver, friend or possibly with cables or the like by the wheelchair occupant. The first position of the platform being one which is horizontally disposed or lowered for being stood on by a rider, i.e., the caregiver or friend. The second position is one wherein the platform is positioned pivoted 90 degrees from the first position and toward the wheelchair, the platform being vertically disposed or pivoted upward (raised) to a resting stored position near the back end of the wheelchair so that the wheelchair isn't any longer or appreciatively longer than without the platform. With the platform in the stored position, the wheelchair is a normal length and shorter than with the platform in the lowered or horizontal position. The length of a wheelchair, inclusive of the wheelchair of the present invention, is important when trying to transport the chair with sitting occupant in a vehicle such as a specially equipped van or the like, and when trying to negotiate tight corners about obstacles. The width of a typical wheelchair is narrow, and this is true of the present wheelchair, wherein the seat is only wide enough (less than 30 inches) for a single sitting person so that the chair can be maneuvered through building halls and doorways, and this can herein be reference to as "single-person-width". The present invention maintains the narrow or single person width, and with the platform raised to a stored position, also maintains the relatively short length allowing the wheelchair and sitting occupant to be transported in a van or other suitable transport vehicle.

My passenger platform is intended to be inexpensive to make or purchase; easy to mount to a wheelchair; convenient to use for riding upon by a passenger; readily storable on the wheelchair when not used as a riding platform, with the stored position allowing normal standard use of the wheelchair by both the chair occupant and attendant who may be standing behind the chair but on the ground. My passenger or rider's platform is also intended to be safe to use, having a non-slip standing surface, and being conveniently and properly located relative to the wheelchair, the wheelchair wheels, and two sturdy handles on the upper rearward portion of the wheelchair elevationally above the platform and useful by the passenger to stabilize him or herself when riding on the platform. My passenger platform is also designed to function well with the wheelchair, not hindering the normal and expected functions and operation of the wheelchair. My passenger platform combination with a powered wheelchair concept is such that numerous structural arrangements can be used to achieve the same basic end results and thus the "invention" is not to be restricted to the specific details given in this disclosure for example.

BRIEF DESCRIPTION OF THE DRAWINGS

FIGS. 1 and 2 show the platform in the lowered or riding position on the powered wheelchair.

BEST MODES FOR CARRYING OUT THE INVENTION

Figure 1:
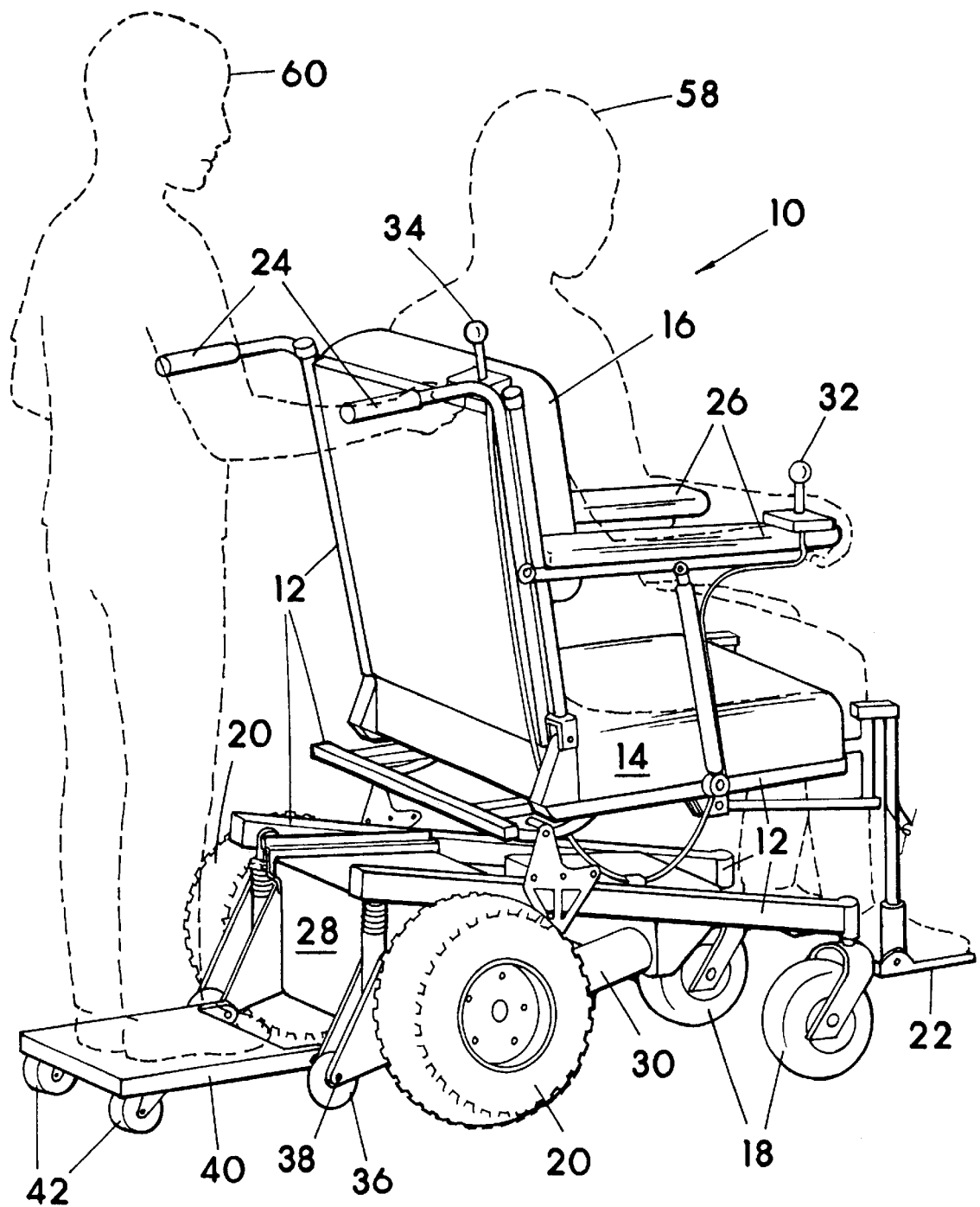
FIG. 1 shows an embodiment in accordance with the present invention.

With reference now to the drawings for a more detailed description. The present invention from one viewpoint is a self-propelled wheelchair structured to allow a second rider, i.e., caregiver or friend, to ride on the wheelchair along with the occupant of the chair of the wheelchair. The present invention from another viewpoint is a platform attachable to a wheelchair, or platform with attachment structuring to attach to and adapt the wheelchair to allow a caregiver or friend to ride on the wheelchair along with the occupant of the chair of the wheelchair. In either case, the present invention solves the above described prior art problem of the caregiver or friend having to walk by way of providing a rider's platform on which the second person stands and is also transported by the wheelchair.

In the drawings, the powered wheelchair with attached platform is indicated at 10, and the platform is indicated at 40. The rider's platform 40 is mounted preferably with hinge or pivot allowing structuring behind the wheelchair, and preferably assumes a first position with wide surface facing upward, and second position with platform narrow edge extending vertically, each position selectable by a caregiver or possibly by way of cables (not shown) or the like by the wheelchair occupant, the cables and platform operating like a draw bridge. The first position of the platform being one which is horizontally disposed or lowered for being stood on by a rider, and the second position being one wherein the platform is stood on edge, being pivoted 90 degrees toward the wheelchair front. The said "90" degrees is approximate, and I do not wish to be held to "90" degrees since less or more than 90 degrees would also function within the scope and intent. When raised into the second or stored position, the platform 40 is vertically disposed or pivoted upward to stored position near or closely adjacent the wheelchair back end so that the wheelchair isn't any longer or appreciatively longer than without the platform. With the platform 40 in the stored position, the wheelchair is preferably of a normal length or is shorter than with the platform 40 in the lowered or horizontal position, and the platform 40 is transported with the wheelchair to always to available when desired. In other words, the platform 40 assumes two positions, one or a first one which renders the wheelchair longer than normal (longer than when the platform is in the second position) and capable of caring a rider on the platform, and the second position or stored being one which renders the wheelchair shorter than when the platform is in the first position, the platform in this explanation is being treated as a part of the wheelchair. Sliding the platform 40 forward further under the wheelchair center area would be acceptable for storage. Platform 40 is mounted elevationally low or near the ground to make is easy to mount with one feet and stand thereupon.

The wheelchair of the present invention can be the same as many prior art wheelchairs, but modified to include the platform 40. The wheelchair of the present invention like most typical powered or self-propelled wheelchairs includes a seat 14, single person width for the occupant to sit on, and a backrest 16 adjacent the seat 14 for the occupant to lean back against. Most powered wheelchairs also include armrests 26 and feet rests 22 for the chair occupant. The seat 14, backrest 16, foot rests 22 and armrests 26, as well as the mounts for chair front wheels 18, back wheels 20 are all attached to a frame or framing structure 12. Handles 24 as well as the mounts for anti-tip wheels 36 (if present) are also typically defined by frame 12, although many of these details can be widely varied within the scope of the invention. The frame 12 is most typically made of metal tubing, but could be fiberglass or plastics or other suitable material. The seat 14 and backrest 16 typically include padding or flexible fabric supported by the framing or members of frame 12. Self-propelled wheelchairs as the term is herein used include seats sufficiently wide for only one rider or chair occupant at a time, with the overall width of the wheelchair being intentionally maintained narrow so as to be able to travel through doorways and the like. While the length of a self-propelled wheelchair is important in maneuvering the wheelchairs beyond or through common obstacles such as doors, ramps, sharp turns and the like, primarily because of door widths, the suitable width of a powered wheel chair is generally regarded as more important than the length thereof during traveling in the wheelchair, and for this reasoning I have structurally arranged my rider's platform to operate with a single person width powered wheelchair wherein the rider when on the platform 40 is directly behind the chair occupant. A chair occupant is shown in broken lines at 58, and a passenger or second rider is shown in broken lines at 60 in FIG. 1. The rider's platform 40 does in most if not all cases somewhat extend the overall length of the wheelchair when in the first position, but returns it to its shorter or normal length when in the raised or stored position with the narrow thickness of platform 40 vertically extending, and does not increase the width of the wheelchair when in either position.

The frame 12 is typically supported above grade on the rotatable wheels 18 and 20, two front and two back wheels typically, the wheels attached to the frame at the lower portion. Self-propelled wheelchairs include one or more motors 30, typically multiple electric motor which are reversible, supported by or mounted to the frame 12 and coupled to drive or rotate wheels 20 when the motors rotate. The motors and couplings of the motors to drive a wheel or wheels to propel the present wheelchair can be structured with a gearbox (gears and coupling shafts) between the motor(s) and wheel(s) as in U.S. Pat. No. 5,575,348 issued Nov. 19, 1996 herein incorporated by reference for this aspect, or with chains and sprockets for another example of drive mechanics as shown in U.S. Pat. No. 3,807,520 issued Apr. 30, 1974 also herein incorporated by reference for the aspect of motor to wheel drive coupling, or a motor with attached hydraulic pump coupled to hydraulic drive motors on the wheels or any other suitable propulsion structuring or propulsion means not requiring the chair occupant to manually power movement of the wheelchair.

The user manipulable controls such as shown at 32 and 34 for receiving travel, steering and braking commands and the like from a human can be any suitable type including any of the known types such as joystick or puff and blow mouth operated types for example only. The chair propulsion motor(s) 30 typically being electric, the motor and controls therefor are normally powered by one or more batteries 28 supported by the frame to travel with the chair and motors. Mechanisms, such as joysticks, puff and blow controls, and the like are supplied to allow occupant to control the motors and steering. Steering is most typically provided by rotating one wheel or the other, or by direction of rotation of the ground contacting wheel or wheels 20 and or 18; wheels can be rotated about the vertical axis for steering.

Duplicate controls are preferred with the present invention, allowing either the chair occupant 58 or rider 60 to control movement of the wheelchair 10, as indicated at 32 and 34 in FIG. 1 wherein joystick utilizing controls are illustrated for example. The controls 32 and 34 are wired in this example to the motors 30 and steering controls and the like located remote of the joysticks. The controls 32 and 34 could be coupled to the motors with wireless links. Controls 32 are mounted to the wheelchair and positioned to be accessed by a person sitting in the seat, and controls 34 are mounted to the wheelchair and positioned to be accessed by a person standing on platform 40.

In a preferred embodiment of the present invention, platform 40 pivotally mounted at the wheelchair back end, is in-part supported on 360 degree swivel casters 42 (wheels) near the ground and behind the chair seat and handicapped person in the seat. The casters or wheels 42 support the distal end of the platform away from the pivotal mounts by way of engaging the ground surface (whatever surface is being traversed). Two casters 42 are shown, but just one wheel or caster centrally mounted would also function. The pivot attachment of the platform 40 to the wheelchair also serves as a live axle or working pivot during use, allowing the platform 40 to pivot and change angle relative to the wheelchair when the casters 42 encounter bumps or elevational changes. The pivoting of the platform is about a horizontal axis.

My passenger platform 40 is made of sufficiently strong and durable materials to carry the intended loads, and I have made it from aluminum covered with a non-skid plastic coating. Other materials such as steel would also function well, and certain types of plastics, particularly glass filled or reinforced plastics could also be used to define at least the rectangular foot rest area of the platform, and probably also the extending mounting ears 44. The platform 40 is sized for supporting two feet (shoes) of the rider simultaneously, and should be non-slip or having a non-slip surface 46 in the area where the feet (shoe soles) contact.

Figure 2:
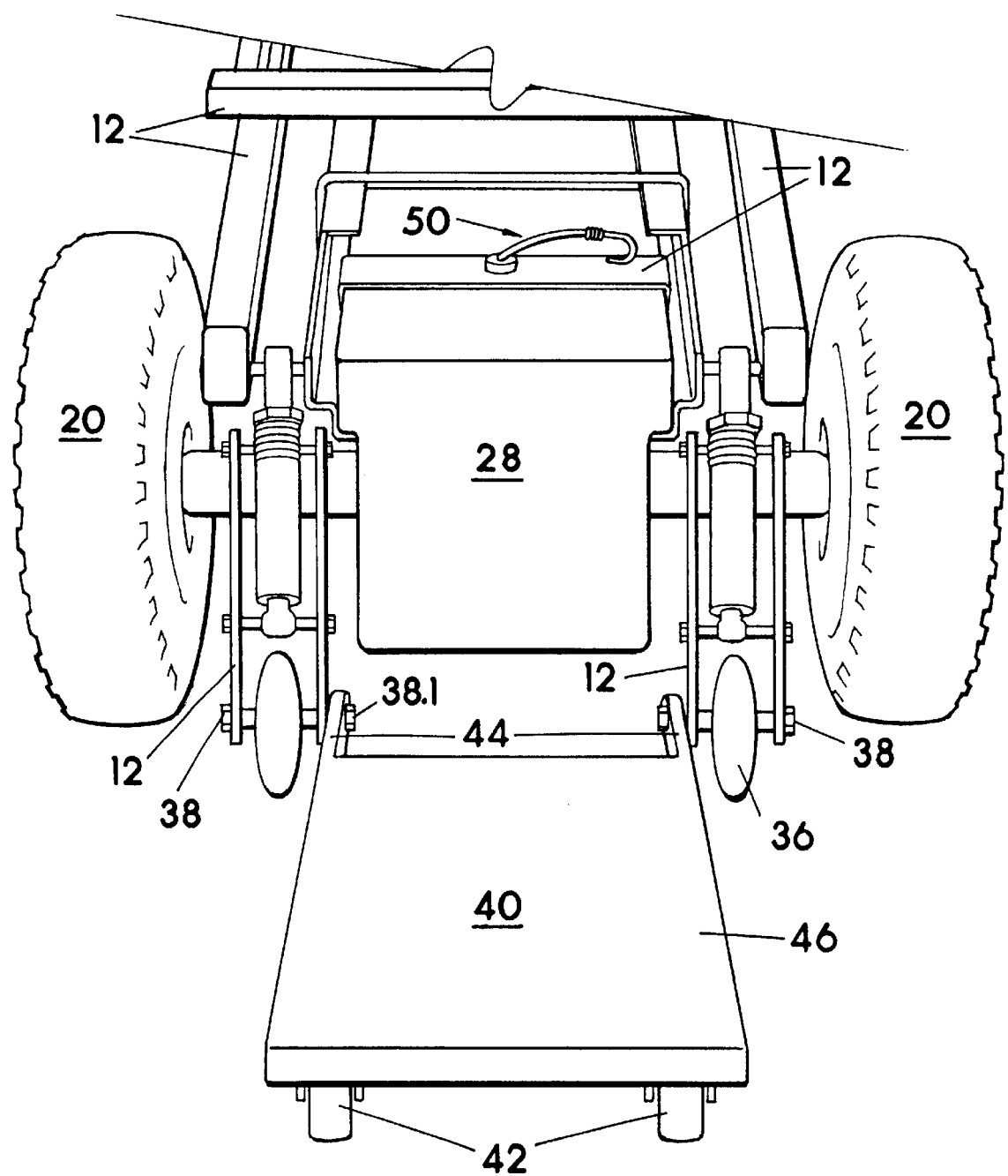
FIG. 2 shows the FIG. 1 wheelchair with platform from the back end.
Figure 4:
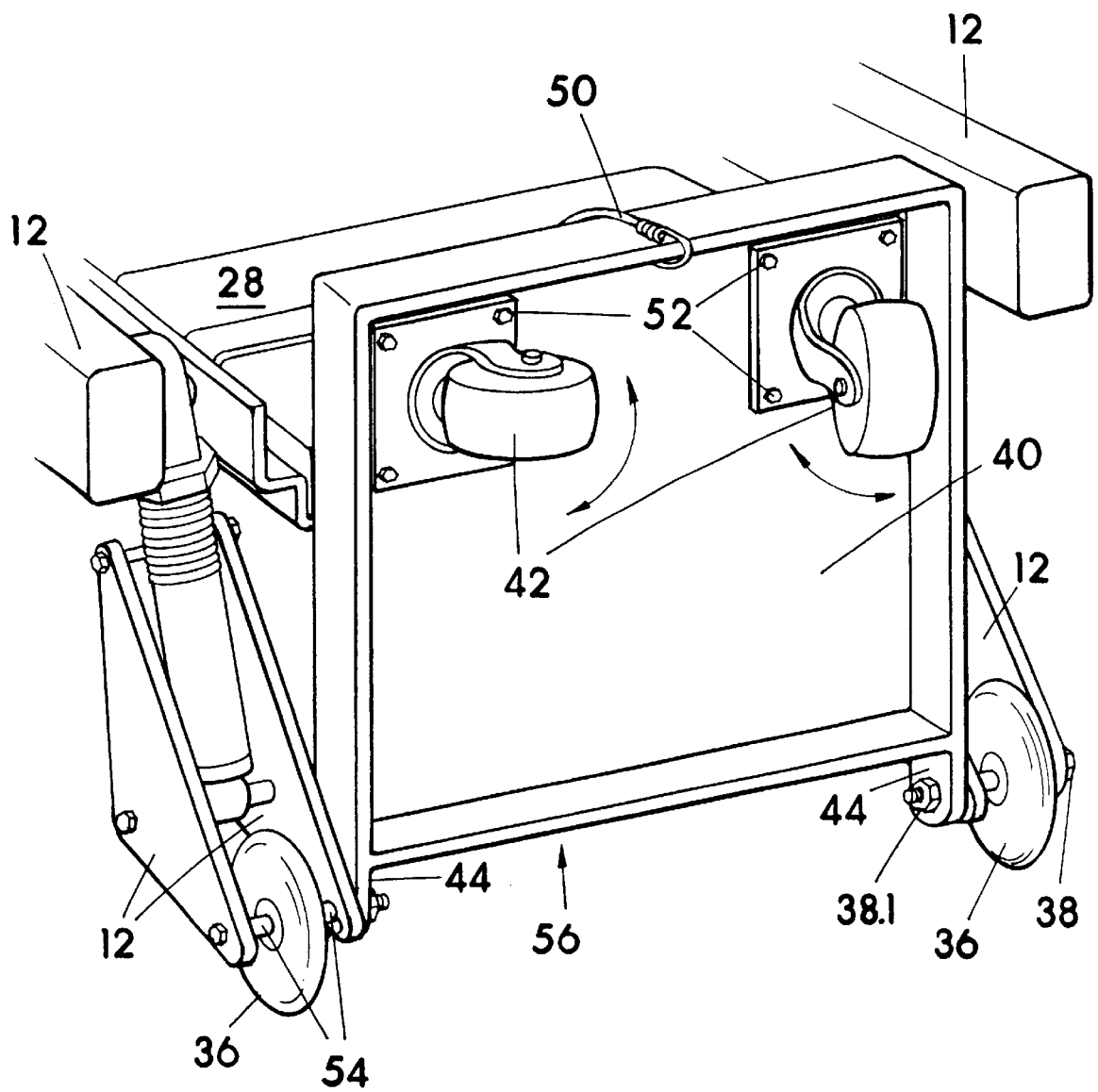
FIG. 4 shows the FIG. 1 wheelchair with platform from the back end but with the platform in the raised or stored position vertically disposed and closely adjacent the wheelchair and wheelchair framing.

The casters or wheels of the passenger standing platform can be attached to the rectangular portion or a reinforced area or frame of the platform 40 using any suitable attachment arrangement, and in building and testing my invention, I simply bolt (see fastener 52 in FIG. 4) the mounting bases of the casters 42 to the platform 40. The casters 42 are exposed at or mounted to what I consider the bottom of platform 40, the surface facing the ground when in the first or riding position, with the oppositely disposed surface on which the rider's feet are placed being considered the top of the platform 40. I prefer to use two spaced casters attached to the rectangular portion of the platform, the casters 42 positioned far or away from the wheelchair and pivots (distally mounted) since the other end of the rectangular platform is pivotally mounted to the wheelchair and supported thereby, and the casters are used to support the other end of the platform as shown in FIG. 1 which is a distance from the wheelchair. The casters 42 include wheels which rotate (spin about a horizontal axis) in typical fashions for rolling along a surface, and the casters 42 also are supported on a vertical axis rotatable in 360 degrees to allow the wheels to swivel or aim (spin about a vertical axis) in any direction about 360 degrees, and this allowing for the casters to "follow" when the wheelchair is turned during travel. Only one caster mounted in the rear center of the rectangular platform would probably function within the scope of the invention, as would three or more casters instead of the shown two, but for strength, stability and economics, two casters mounted as shown in FIGS. 1, 2, and 4 seem reasonable. The preferred casters include wheels which are made of plastics such as urethane, or any other suitable material or spring arrangement to provide some shock absorbtion to help protect the passenger from excessive vibration.

FIG. 1 is a rear perspective view of a powered wheelchair including a passenger standing platform 40 in accordance with the present invention. The wheelchair is just an example and can take numerous structural forms within the scope of the invention. The platform 40 is shown in the first of the two possible positions, i.e., downward as shown in FIG. 1 for standing upon by a passenger. Platform 40 is upward vertically positioned for compact and out-of-the-way storage in FIG. 4. Also shown in FIG. 1 are handles 24 at the rear of the wheelchair elevationally above the platform 40 within ready grasping distance of a passenger, thereby allowing a passenger standing on the platform 40 to stabilize him or herself relative to the wheelchair 10. Two handles are best but one grippable area would function suitably.

FIG. 2 is a closer rear perspective view of the wheelchair and passenger standing platform 40 of FIG. 1. Shown are the anti-tip small rear wheels 36 and mounts therefor which are common on many modern powered wheelchairs. The two anti-tip wheels 36 are in spaced relationship to one another, and platform 40 is mounted to be positioned generally between and mostly behind or more rearward of the wheels 36. The anti-tip wheels 36 typically do not contact the ground, and serve to prevent the backward overturning of the wheelchair when placed in a steep incline. The specific platform 40 shown in the drawings as thin and rectangular, although not restricted to such, is structured to pivotally attach to "like" mounting bolts serving as axles for the anti-tip wheels 36 of the wheelchair, and thereby use the same axles 38 "in effect", although in most cases the existing anti-tip wheel mounting bolts need to be replaced with bolts ½ to 1.5 inch longer (example only) due to the added distance required to span the material of the ears 44 as shown in FIGS. 2 and 4. If anti-tip wheel mounting hardware is being used and modified via using a longer bolt 38 (axle), and the anti-tip wheel mounts as shown in FIG. 4 use wheel centering sleeves 54 over the exterior of the axle/bolt 38, such existing can still be used. The extending mounting ears 44 of the platform 40 are used extending toward the wheelchair as shown in FIG. 2, and in FIG. 4 it can be seen that the extending effect of the ears 44 provides the benefit of increased clearance at 56 (FIG. 4) between the lowest portion of the standing platform between the ears 44 and the ground when the platform is in the second or stored position. The extending mounting ears 44, while being highly desirable for this purpose can be eliminated and the pivotal mounting or axle simply applied to the platform in the lower corner (FIG. 4) of an "ear-less" platform (ear-less platform not shown), although this would reduce the ground clearance of the stored platform 40. "Rectangular" in shape for the foot rest area of the passenger standing platform 40 although very suitable in all conditions to my knowledge, is not a requirement of the invention, in that I suppose oval, circular, odd shaped open bar patterns and or the like could be utilized within the scope of the invention. The platform 40 in general is attached to the frame or framing members of the wheelchair, and the supporting structure of the shown anti-tip wheels 36 is considered part of the frame 12.

Figure 3:
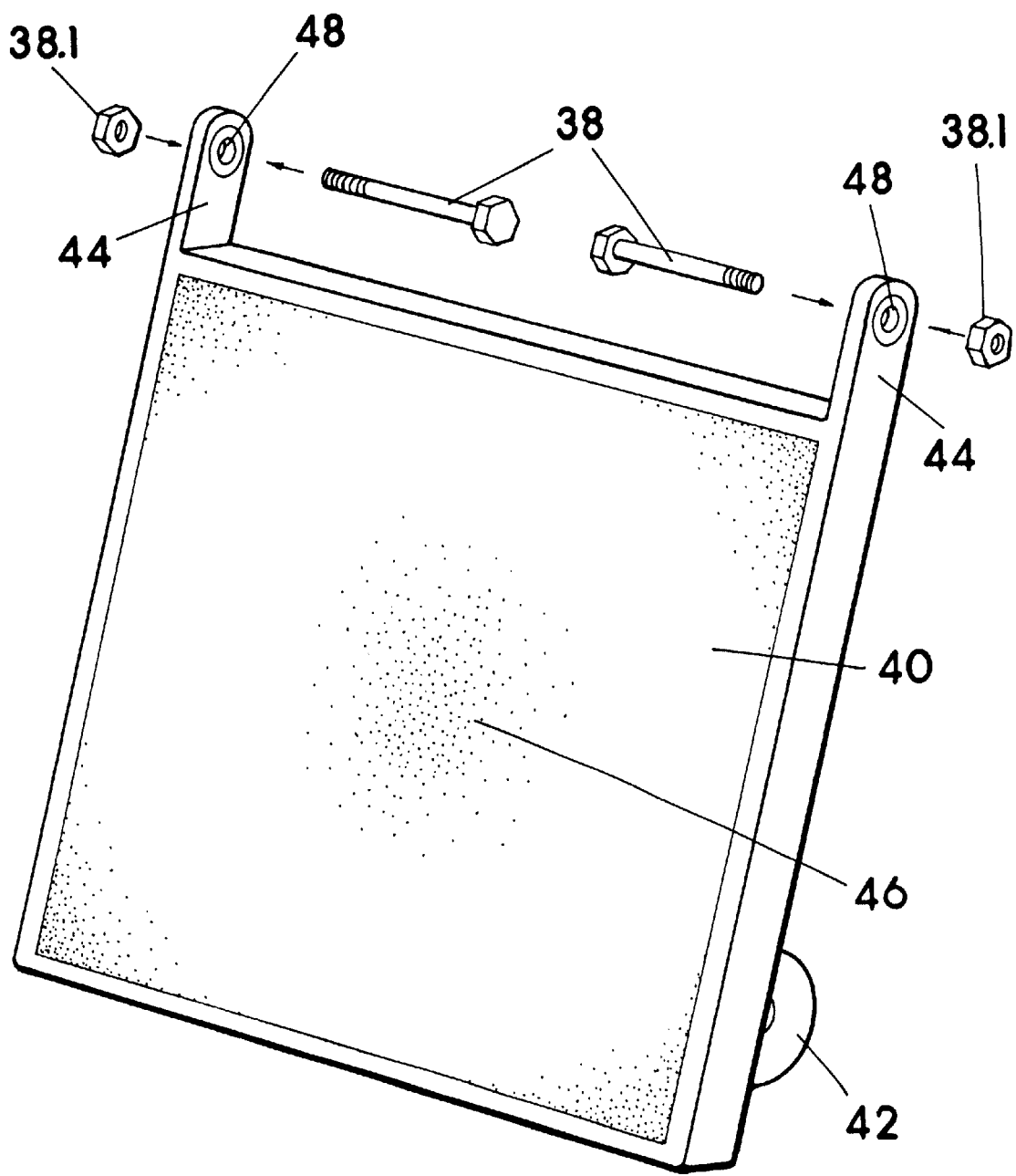
FIG. 3 shows the platform dismounted from the wheelchair.

FIG. 3 is a perspective view of the passenger standing platform 40 removed from the wheelchair and showing the mounting or mount-ears 44 with holes 48 therethrough which are preferably holes in a bushing or bearing connected to ear 44 (pressed into a larger hole in the ear 44) for receiving mount axles 38 shown as the shanks of mounting bolts used with retaining nuts 38.1 for securing the bolts (axles 38 and the bolts are the same in this example) in position to the wheelchair frame members 12 supporting the anti-tip wheels 36, or to anti-tip wheel-less bars (not shown) as on some models of powered wheelchairs. During use with a passenger standing upon the platform 40 and the wheelchair traveling along a surface, the pivotally mounted end of the platform 40 at the bolts 38 (axles) works back and forth rotationally about a horizontal axis on the axles as the 360 degree casters 42 and back end of the platform 40 ride upward and downward on bumps and dips of the contacted surface (road, sidewalk, lawn, driveway, rough terrain), therefore I prefer to have the mounting axles (bolts) passing through bearings or at least bushings capable of providing smooth relative rotation and acceptable durability.

FIG. 4 is a perspective of the rear or back portion of the wheelchair of FIGS. 1—3 with the platform 40 having been tilted or pivoted upward approximately 90 degrees to the second or stored position, standing vertically and retained as such in this example with an elastic cord and hook 50 anchored to the wheelchair frame 12; the hook engaging the platform 40 so as to retain the platform vertical and stored until manually un-hooked to allow pivoting the platform down into the horizontal riding position. Other retaining means such as friction, magnetic, snap or hook latches, pins and notched grooves, holders or retainers which are readily intentionally defeated when desired to allow repositioning of the platform to the first position can be used instead of the shown cord and hook 50.

The motorized wheelchair can be conventional in all aspects including the drive mechanics and controls, and what is meant by this is that other than the mounting of the passenger standing platform to the wheelchair in accordance with the invention, basically the wheelchair, dependant upon the wheelchair model, does not need to be modified, although it can be modified in other ways within the scope of the invention.

The battery, at least for most models of powered wheelchairs, is usually located underneath the seat, and the batteries of most models of powered wheelchairs can be more easily removed from under the seat for inspection and servicing due to the location of the present passenger standing platform of the instant invention, wherein the battery is conveniently pulled from underneath the seat onto the platform 40 where it is readily examined and serviced.

The inventive combination, at least from one of several possible view points of the invention, is the passenger stand platform mounted to the back-end of the wheelchair which allows, for example, the caregiver or the like to also be transported by the wheelchair. The passenger standing platform can be used for cargo other than a person, although cargo securing arrangements should be applied since cargo cannot hold onto the handles 24 like a human rider 60.

My invention has been described above in great detail by way of example, and changes from that described and shown can be made within the true scope of the invention which should be determined by the broadest possible and reasonable interpretation of my claims.

I claim:

1. A wheelchair with platform, comprising;

a self-propelled wheelchair having a seat to be occupied by a first person in a sitting position to be transported by said wheelchair, said seat sufficiently wide enough for only a single sitting person;

anti-tip wheels attached to said wheelchair and positioned at a back end of said wheelchair, said anti-tip wheels comprising at least two wheels in spaced relationship to one another, each of the anti-tip wheels is attached to a frame member of said wheelchair utilizing one axle for each of the anti-tip wheels;

a platform attached to said wheelchair, said platform positioned adjacent and generally rearward of the two anti-tip wheels and sufficiently low in elevation to be stood upon by a second person to be transported by said wheelchair simultaneously with the first person; said platform attached to said wheelchair by attachment structuring utilizing the axles also used to attach said anti-tip wheels, said attachment structuring allowing movement of said platform on the axles about a horizontal axis, whereby the anti-tip wheels and said platform share a pair of axles, at least one rotatable wheel attached to said platform and positioned to engage a ground surface and to thereby aid in supporting said platform when a person is standing on said platform.

2. A wheelchair with platform according to claim 1 wherein the self-propelled wheelchair includes at least one motor powered by a battery.

3. A wheelchair with platform according to claim 2 wherein said platform can be selectively positioned in a first position to be stood on by a person, and selectively positioned to be in a second position for storage closely adjacent said wheelchair and transported by said wheelchair.

4. A wheelchair with platform according to claim 3 wherein the wheelchair includes first controls for the at least one motor mounted to the wheelchair in position for access by a person sitting in the seat, and second controls for the at least one motor mounted to the wheelchair in position for access by a person utilizing said platform to be transported.

5. A wheelchair with platform according to claim 3 wherein said at least one rotatable wheel comprises two swivel casters.

\* \* \* \* \*